(12) United States Patent
Tremblay (10) Patent No.: US 7,673,005 B2
(45) Date of Patent: Mar. 2, 2010

(54) METHOD, APPARATUS, AND COMPUTER-READABLE STORAGE MEDIUM COMPRISING PROGRAM ELEMENT FOR ELECTRONIC MAIL COMMUNICATION

(76) Inventor: Martin Tremblay, 6343 Milly Street, Montreal, Quebec (CA) H1P 2Z7

( * ) Notice: Subject to any disclaimer, the term of this patent is extended or adjusted under 35 U.S.C. 154(b) by 322 days.

(21) Appl. No.: 11/768,456

(22) Filed: Jun. 26, 2007

(65) Prior Publication Data

US 2007/0299924 A1 Dec. 27, 2007

Related U.S. Application Data

(60) Provisional application No. 60/816,606, filed on Jun. 27, 2006.

(51) Int. Cl.
*G06F 15/16* (2006.01)

(52) U.S. Cl. .................. 709/206; 709/201; 709/204

(58) Field of Classification Search ................. None
See application file for complete search history.

(56) References Cited

U.S. PATENT DOCUMENTS

| | | | |
|---|---|---|---|
| 6,356,937 B1 * | 3/2002 | Montville et al. ........... 709/206 |
| 6,505,236 B1 | 1/2003 | Pollack | |
| 6,563,913 B1 | 5/2003 | Kaghazian | |
| 6,839,741 B1 | 1/2005 | Tsai | |
| 6,948,131 B1 * | 9/2005 | Neven et al. ................ 715/753 |
| 2002/0080415 A1 | 6/2002 | Akimoto et al. | |
| 2002/0156852 A1 * | 10/2002 | Hughes et al. .............. 709/206 |
| 2003/0023697 A1 | 1/2003 | Okada | |
| 2003/0185357 A1 | 10/2003 | Kaghazian | |
| 2004/0068545 A1 * | 4/2004 | Daniell et al. ............... 709/206 |
| 2004/0249817 A1 * | 12/2004 | Liu et al. ........................ 707/9 |
| 2007/0233459 A1 * | 10/2007 | Perronnin ....................... 704/9 |

* cited by examiner

*Primary Examiner*—John B. Walsh (57) ABSTRACT

A computer-readable storage medium comprising a program element for execution by a processing device to implement an electronic mail processing entity. The program element comprises program code for receiving an indication of an electronic mail message selected by a user, the electronic mail message including a header portion, a body portion, and an attachment. The program element also comprises program code for providing the user with an opportunity to select an option to exclusively transmit the attachment of the electronic mail message. Also provided are an apparatus for processing electronic mail, a method for processing electronic mail, and a graphical user interface for interacting with a user to provide electronic mail communication capability to the user.

23 Claims, 9 Drawing Sheets

FIG. 9

METHOD, APPARATUS, AND COMPUTER-READABLE STORAGE MEDIUM COMPRISING PROGRAM ELEMENT FOR ELECTRONIC MAIL COMMUNICATION

CROSS-REFERENCE TO RELATED APPLICATION

This application claims the benefit under 35 USC 119(e) of U.S. Provisional Patent Application No. 60/816,606 filed on Jun. 27, 2006 and hereby incorporated by reference herein.

FIELD OF THE INVENTION

The present invention relates generally to electronic mail (email) communication and, more particularly, to a method, apparatus, and computer-readable storage medium comprising a program element for transmitting at least one attachment of an original email message.

BACKGROUND

Electronic mail (email) is convenient and allows communication of various types of information. For example, an email message typically has a body portion comprising primarily text data and possibly non-text data (e.g., specification of a font size/type, a hyperlink, etc.). The email message may also optionally have one or more attachments each representing a file (e.g., a word processing document file, a spreadsheet file, a picture file, a video file, an audio file, etc.).

Occasionally, a received, sent, or saved email message may have one or more attachments deemed of sufficient interest to warrant further transmittal to other parties. Currently, this can be achieved using a "forward" function available in most common email processing software applications. However, the "forward" function results in transmittal of the received, sent, or saved email message in its entirety, including its body portion. This characteristic makes it difficult and/or inconvenient to transmit the attachment(s) of a received, sent, or saved email message without revealing that email message's context, sender and/or intended recipient(s). Also, this characteristic makes it difficult and/or inconvenient to transmit to a plurality of parties the same attachment(s) of a received, sent, or saved email message, but by way of respective new email messages that are personalized for each of the parties.

In these and various other scenarios, it is clear that there remains a need for an improvement in email communication that facilitates transmittal of one or more attachments of an original email message.

SUMMARY OF THE INVENTION

The present invention provides a computer-readable storage medium comprising a program element for execution by a processing device to implement an electronic mail processing entity. The program element comprises program code for receiving an indication of an electronic mail message selected by a user, the electronic mail message including a header portion, a body portion, and an attachment. The program element also comprises program code for providing the user with an opportunity to select an option to exclusively transmit the attachment of the electronic mail message.

The present invention also provides a method for processing electronic mail. The method comprises receiving an indication of an electronic mail message selected by a user, the electronic mail message including a header portion, a body portion, and an attachment. The method also comprises providing the user with an opportunity to select an option to exclusively transmit the attachment of the electronic mail message.

The present invention also provides an apparatus for processing electronic mail. The apparatus comprises an input for receiving an indication of an electronic mail message selected by a user, the electronic mail message including a header portion, a body portion, and an attachment. The apparatus also comprises a processing entity for providing the user with an opportunity to select an option to exclusively transmit the attachment of the electronic mail message.

The present invention also provides a graphical user interface for interacting with a user to provide electronic mail communication capability to the user. The graphical user interface comprises at least one graphical element enabling the user to select an electronic mail message, the electronic mail message including a header portion, a body portion, and an attachment. The graphical user interface also comprises at least one graphical element enabling the user to select any one of a plurality of options for handling the electronic mail message. The plurality of options includes: a first option to transmit the attachment of the electronic mail message without transmitting the body portion and the header portion of the electronic mail message; and a second option to transmit the attachment of the electronic mail message together with the body portion and the header portion of the electronic mail message.

These and other aspects and features of the present invention will now become apparent to those of ordinary skill in the art upon review of the following description of example embodiments of the invention in conjunction with the accompanying drawings.

BRIEF DESCRIPTION OF THE DRAWINGS

A detailed description of example embodiments of the present invention is provided herein below, by way of example only, with reference to the accompanying drawings in which.

It is to be expressly understood that the description and drawings are only for the purpose of illustration of certain embodiments of the invention and are an aid for understanding. They are not intended to be a definition of the limits of the invention.

DETAILED DESCRIPTION OF EMBODIMENTS

Figure 1:
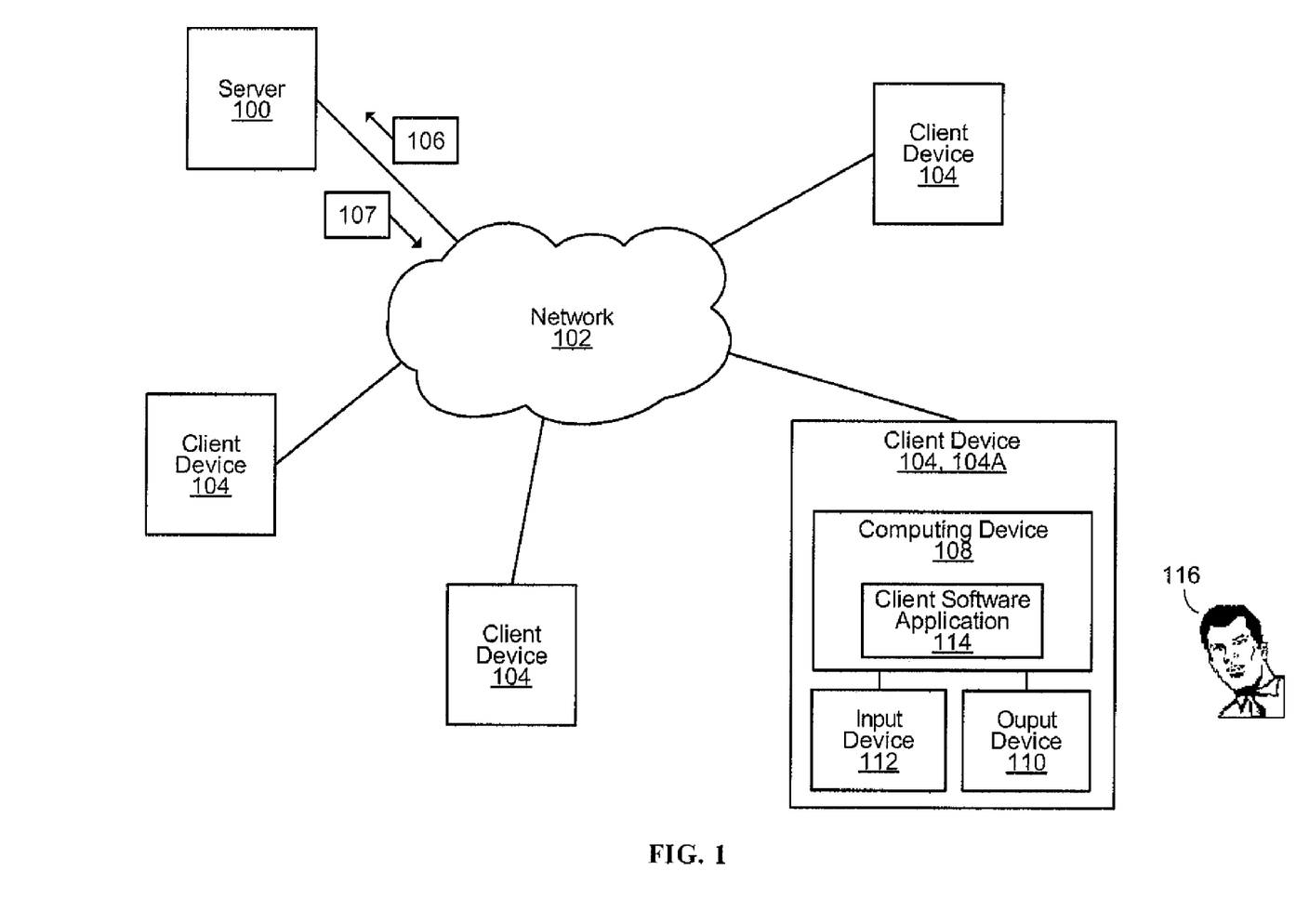
FIG. 1 is a block diagram of a system for electronic mail (email) communication in accordance with an embodiment of the present invention, the system comprising a server and a plurality of client devices.

With reference to FIG. 1, there is shown a system for electronic mail (email) communication in accordance with an embodiment of the present invention. The system comprises a server 100 connected to a network 102. The system also comprises multiple client devices 104 in communication with the server 100. The server 100 receives inbound email messages 106 from senders that are associated with the client devices 104 and/or other devices reachable via the network 102. Analogously, the server 100 sends outbound email messages 107 to recipients that are associated with the client devices 104 and/or other devices reachable via the network 102. In various embodiments, the network 102 may comprise a portion of one or more of a data network (e.g., the internet, a local area network—LAN, a wide area network—WAN), a public telephony network (e.g., the Public Switched Telephony Network—PSTN), and a wireless network (e.g., a cellular network).

A particular one of the client devices 104, designated 104A, is connected to the server 100 via the network 102. The client device 104A comprises a computing device 108, an output device 110 (e.g., a display and/or a speaker), and an input device 112 (e.g., a keyboard, a mouse, a microphone, a stylus, and/or a touchscreen). In some embodiments, the client device 104A may be a personal computer or a workstation. In other embodiments, the client device 104A may be a networked personal digital assistant (PDA) or other wireless communication device (e.g., Blackberry®). The client device 104A may be used in various scenarios such as, for example, a corporate network scenario, a client/service provider scenario, or a webmail/internet email service scenario (e.g., Hotmail®, Gmail®, etc.).

The computing device 108 runs a client software application 114 that implements a graphical user interface (GUI) operative to interact with a user 116 via the output device 110 and the input device 112. The client software application 114 cooperates with the server 100 to provide email communication capability to the user 116.

Figure 2:
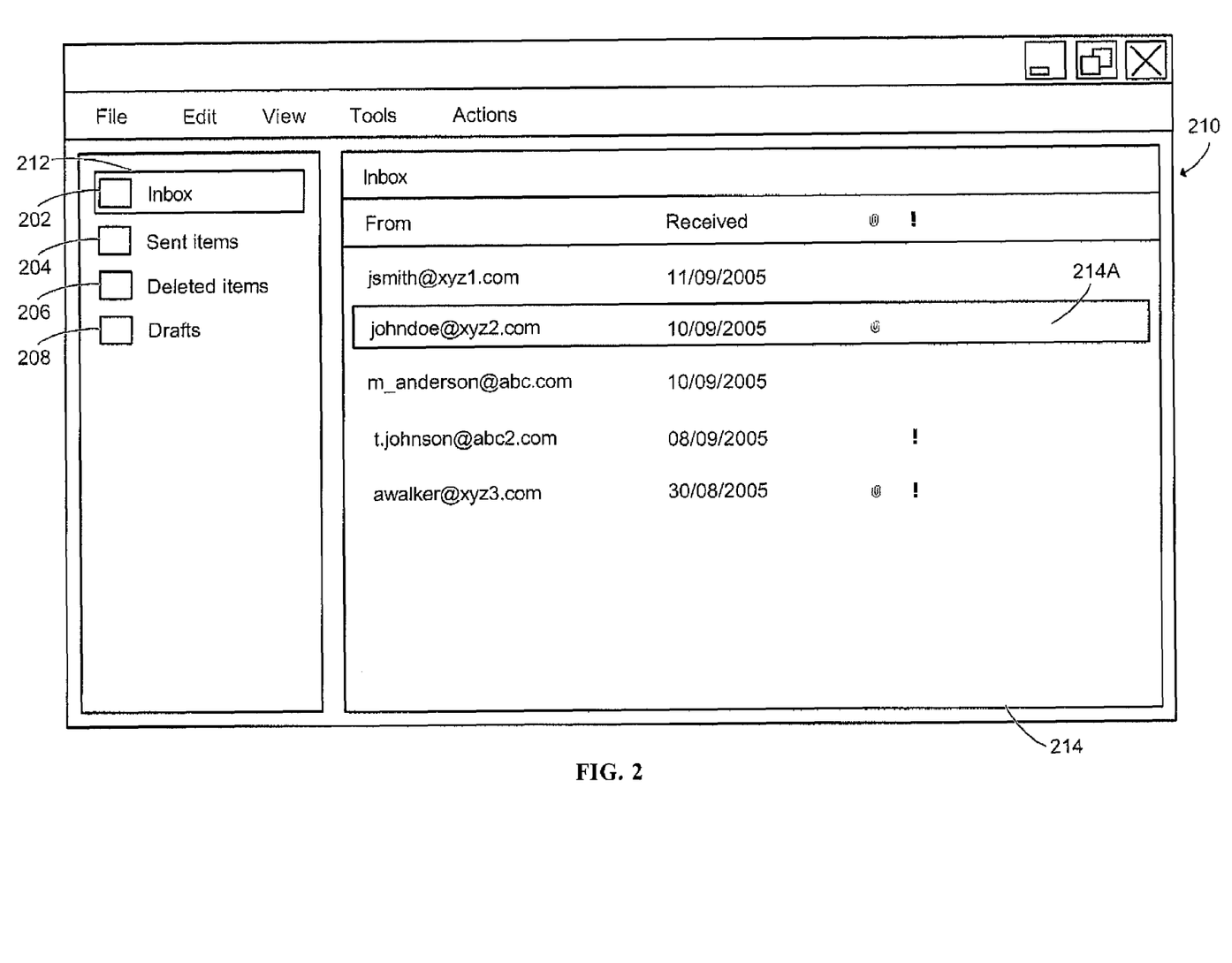
FIG. 2 depicts an example of a manifestation of a graphical user interface (GUI) for interacting with a user of one of the client devices of FIG. 1.

Referring to FIG. 2, there is shown an example of a manifestation of the GUI on the output device 110, which provides a window 210 that displays a set of folders including an inbox folder 202, a sent items folder 204, a deleted items folder 206, and a drafts folder 208. Individual ones of the folders 202, 204, 206, 208 can be selected by the user 116 using the input device 112. Identification of a selected folder, assumed in this case to be the inbox folder 202, may be achieved by highlighting a corresponding region 212 of the window 210 using the input device 112 (e.g., by moving and clicking on a mouse and/or by pressing on one or more keys). Associated with the selected folder 202 is a set of email message data elements 214 representing received email messages destined for the user 116.

Figure 3:
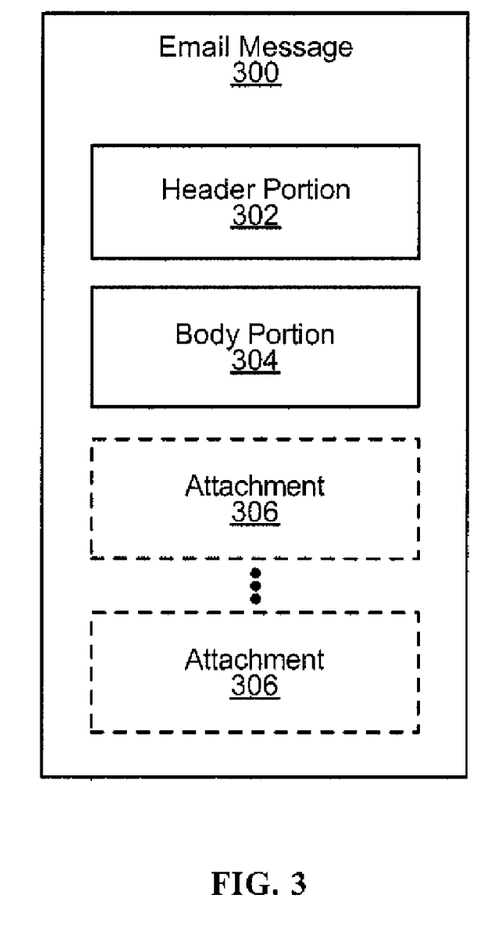
FIG. 3 shows an email message including a header portion, a body portion, and optionally one or more attachments.

Generally speaking, with reference now to FIG. 3, an email message 300 can be viewed as including a header portion 302, a body portion 304, and possibly one or more attachments 306.

The header portion 302 of the email message 300 has header content. The header content comprises information regarding a sender and information regarding at least one intended recipient of the email message 300, as well as possibly other information such as information regarding a subject, a date and/or time, and an importance and/or sensitivity (e.g., high or low).

The body portion 304 of the email message 300 has information content. The information content comprises text data that can be entered by whichever party composed the email message 300. In addition, the body portion 304 may possibly also have ancillary content, which comprises non-text data (e.g., specification of a font size/type, a hyperlink, etc.). In some cases, the body portion 304 may be blank, i.e., devoid of any information content and any ancillary content.

Each attachment 306 of the email message 300 is an optional component and, should it exist, represents a file (e.g., a word processing document file, a spreadsheet file, a picture file, a video file, an audio file, etc.). Specifically, each attachment 306 can be an encoded version of data content of the file that it represents. In one example of implementation, the file in question may be stored in a memory of the computing device 108. In another example of implementation, the file may be stored on the server 100, a situation that can be referred to as one where the server 100 "hosts" attachments for the client device 104A.

Returning now to FIG. 2, the set of email message data elements 214 associated with the selected folder 202 is indicative of characteristics of respective received email messages destined for the user 116. The characteristics of a particular received email message destined for the user 116 may be derived from the header portion, the body portion and the attachments), if any, of the particular received email message and may include a combination of: the sender of the particular received email message, whether the particular received email message has one or more attachments, the importance and/or sensitivity of the particular received email message, the time and/or date at which the particular email message was received, the size (e.g., in bytes) of the attachment(s), if any, etc.

Within the set of email message data elements 214 associated with the selected folder 202, it is possible for the user 116 to make a selection of a particular email message (hereinafter referred to as a "selected email message"). Identification of the selected email message may be achieved by highlighting a corresponding email message data element 214A of the window 210 using the input device 112 (e.g., by moving and clicking on a mouse and/or by pressing on one or more keys).

Figure 4:
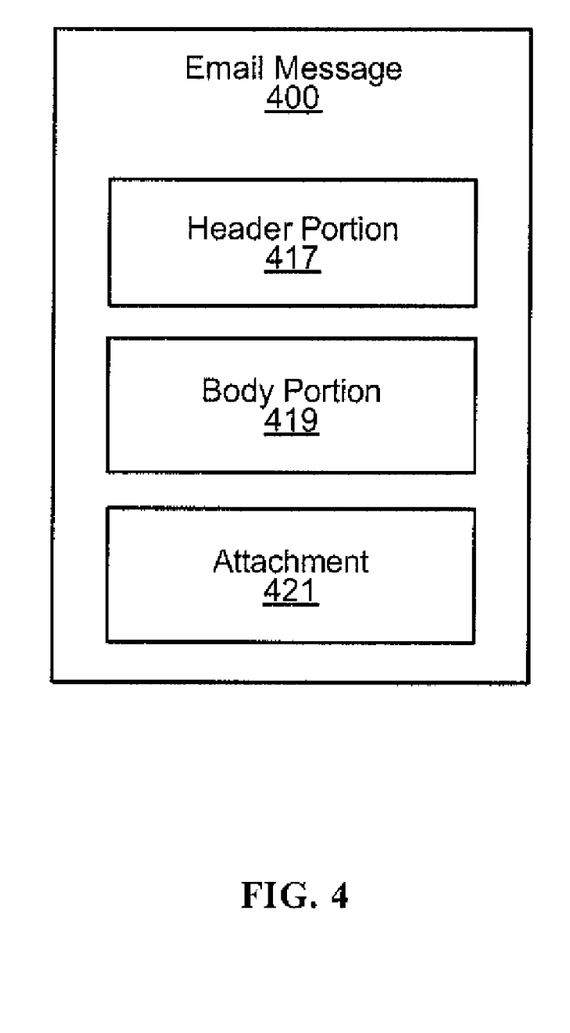
FIG. 4 shows an example of a selected email message that includes a header portion having header content, a body portion having information content, and an attachment.

As shown in FIG. 4, for purposes of this example, the selected email message, which is denoted 400, has a header portion 417, a body portion 419, and an attachment 421. In various embodiments, the selected email message 400 may be stored in a memory of the client device 104A or on the server 100. In another embodiment, copies of the selected email message 400 may be stored in a memory of the client device 104A and on the server 100.

Figure 5:
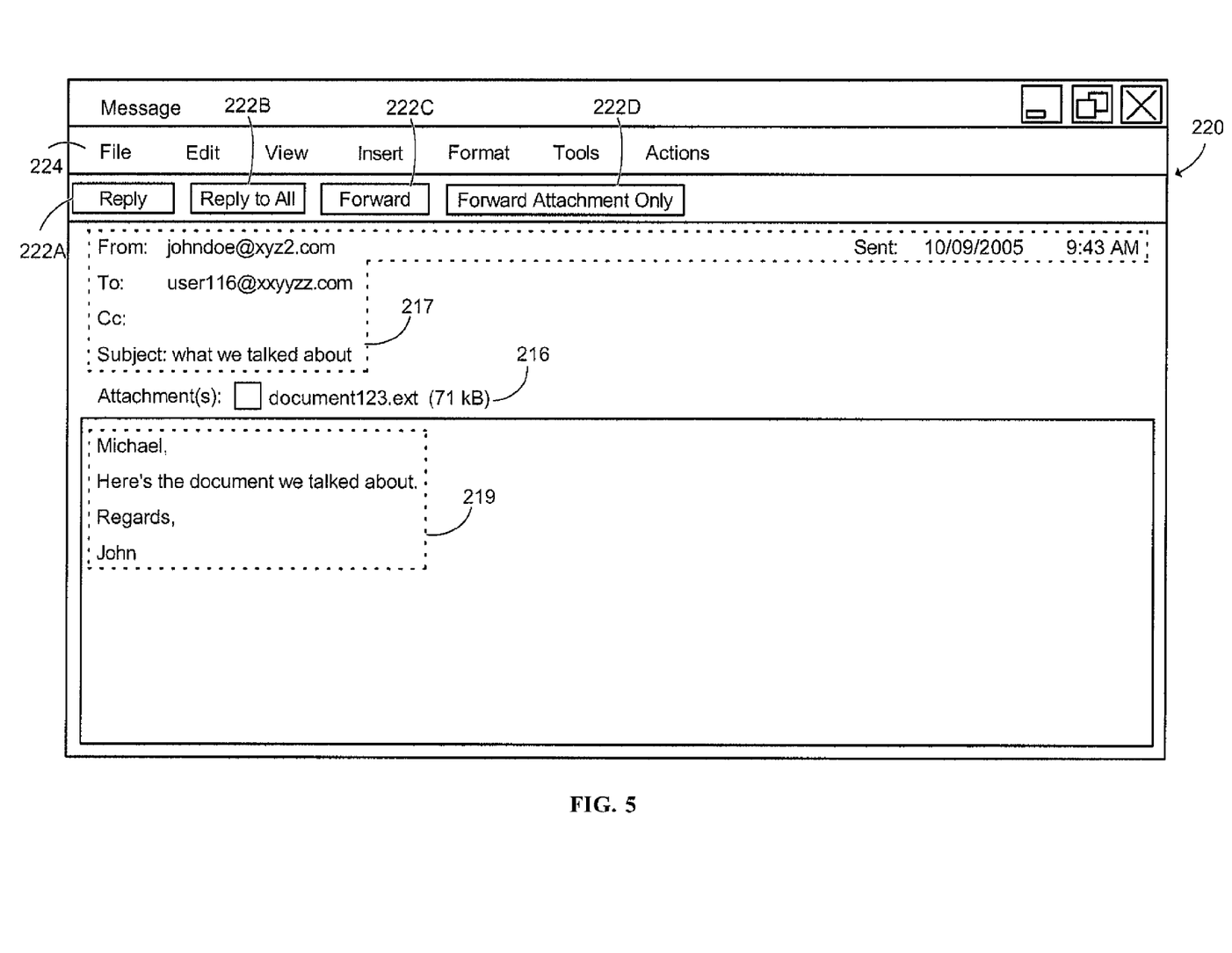
FIG. 5 shows an example of a window associated with the selected email message of FIG. 4, the window providing a set of options for handling the selected email message.

Referring now to FIG. 5, further interaction with the input device 112 (e.g., double-clicking on a mouse or pressing a key) may result in the GUI providing a window 220 associated with the selected email message 400. The window 220 displays a header data element 217 that represents the header portion 417 of the selected email message 400 and a body data element 219 that represents the body portion 419 of the selected email message 400. The window 220 also provides a graphical element 216 (which, in this example, includes an icon, a file name, and a file size) that represents the attachment 421 of the selected email message 400. Optionally, in some embodiments, a preview pane (not shown) may be provided in the window 210 to display various information regarding the selected email message 400, such as all or part of the information content of the body portion 419 of the selected email message 400.

The client software application 114 running on the computing device 108 provides a set of options for handling the selected email message 400. Examples of options for handling the selected email message 400 include a "reply" option, a "reply to all" option, a "forward" option, and, in accordance with an embodiment of the present invention, also a "forward attachment only" option.

The "reply" option enables the user 116 to reply to the sender of the selected email message 400 by initiating preparation of a new email message (not shown) including: (1) a header portion specifying that the intended recipient of this new email message is the sender of the selected email message 400; and (2) a body portion having information content that comprises (i) reply text data entered by the user 116; (ii) the information content of the body portion 419 of the selected email message 400; and (iii) part or all of the header content of the header portion 417 of the selected email message 400. The body portion of the new email message may also have ancillary content, which may comprise non-text data possibly imported from the body portion 419 of the selected email message 400. The user 116 may optionally attach one or more attachments of the user's choice to the new email message.

The "reply to all" option enables the user 116 to reply to the sender of the selected email message 400 as well as to any other intended recipient of the selected email message 400 (e.g., one or more carbon copied (cc) parties) by initiating preparation of a new email message (not shown) including: (1) a header portion specifying that the intended recipients of this new email message are the sender of the selected email message 400 and any other intended recipient of the selected email message 400; and (2) a body portion having information content that comprises (i) reply text data entered by the user 116; (ii) the information content of the body portion 419 of the selected email message 400; and (iii) part or all of the header content of the header portion 417 of the selected email message 400. The body portion of the new email message may also have ancillary content, which may comprise non-text data possibly imported from the body portion 419 of the selected email message 400. The user 116 may optionally attach one or more attachments of the user's choice to the new email message.

The "forward" option enables the user 116 to forward (i.e., transmit) the selected email message 400 to at least one intended recipient of the user's choice by initiating preparation of a new email message (not shown) including: (1) a header portion having header content that comprises recipient information entered by the user 116; (2) a body portion having information content that comprises (i) text data entered by the user 116; (ii) the information content of the body portion 419 of the selected email message 400; and (iii) part or all of the header content of the header portion 417 of the selected email message 400; and (3) an attachment that corresponds to the attachment 421 of the selected email message 400. The body portion of the new email message may also have ancillary content, which may comprise non-text data possibly imported from the body portion 419 of the selected email message 400. The user 116 may optionally attach one or more additional attachments of the user's choice to the new email message.

Finally, in accordance with the "forward attachment only" option, and as described later on in further detail, the user 116 is provided with an opportunity to exclusively transmit the attachment 421 of the selected email message 400 to at least one intended recipient of the user's choice. It is recalled that, in this example, the selected email message 400 has one attachment 421. A description of how to handle multiple attachments is also provided further below.

A variety of possibilities are contemplated to allow the user 116 to select a particular option for handling the selected email message 400. For example, with reference to FIG. 5, the GUI may provide in the window 220 a plurality of buttons 222A, 222B, 222C, 222D associated with individual ones of the aforesaid options, each button being selectable by the user 116 using the input device 112. For instance, the user 116 may use the input device 112 to click on the button associated with the option of the user's choice. Other manners of selecting a particular option for handling the selected email message 400 may involve, for example, pressing one or more keys of a keyboard, touching a touchscreen, using a stylus, uttering one or more voice commands into a microphone, etc.

As another example, the GUI may provide in the window 220 a menu bar 224 from which a drop-down menu (not shown) listing items corresponding to the aforementioned options for handling the selected email message 400 may be obtained by the user 116 via interaction with the input device 112. For instance, the user 116 may use the input device 112 to obtain the drop-down menu from the menu bar 224 and select from that drop-down menu the item corresponding to the option of the user's choice.

As yet another example, selection of a particular option for handling the selected email message 400 may be effected via the window 210 that displays the set of email message data elements 214 representing received email messages destined for the user 116 (FIG. 2). For instance, clicking on the corresponding email message data element 214A (e.g., via a right click on a mouse) may result in display in the window 210 of a menu (not shown) listing items corresponding to the aforementioned options for handling the selected email message 400. The user 116 may then use the input device 112 to effect such clicking and select the item corresponding to the option of the user's choice from the resulting menu displayed in the window 210. The GUI may also provide in the window 210 a plurality of buttons (not shown) similar to the plurality of buttons 222A, 222B, 222C, 222D of the window 220 that are associated with individual ones of the aforesaid options.

It will be appreciated that various other possibilities exist for enabling the user 116 to select a particular option for handling the selected email message 400. It should also be noted that although in this example the selected folder is the inbox folder 202, a similar approach would apply to selecting an option for handling an email message in a different folder, including the sent items folder 204, the deleted items folder 206, or even a personal folder (not shown). For example, the sent items folder 204 may be associated with a set of email message data elements (not shown) representing sent email messages originated by the user 116, the deleted items folder 206 may be associated with a set of email message data elements (not shown) representing deleted email messages, etc.

Figure 6:
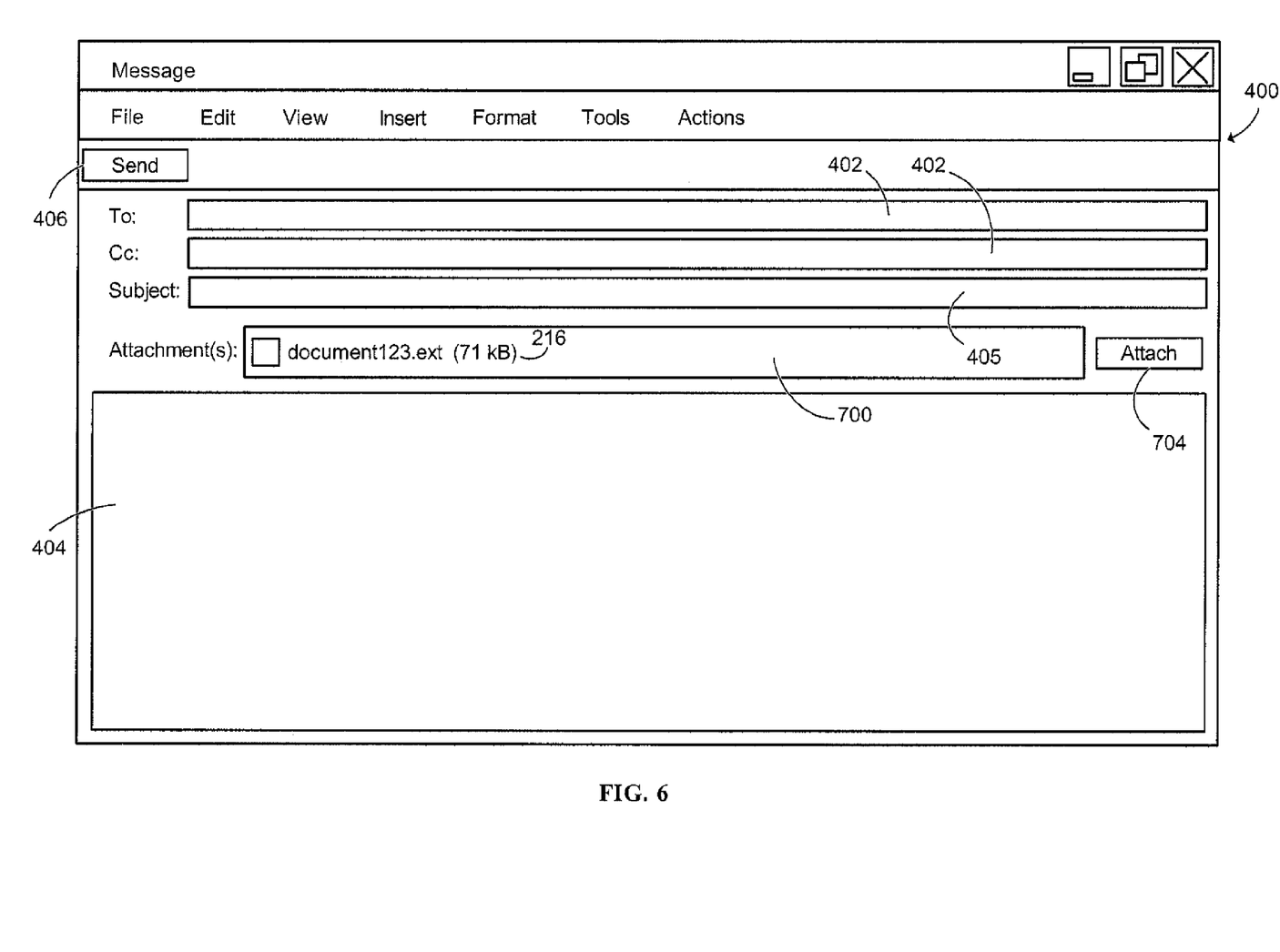
FIG. 6 shows an example of a window associated with preparation of a new email message, the new email message including (1) an attachment that corresponds to the attachment of the selected email message and (2) a body portion that lacks the information content of the body portion of the selected email message and the header content of the header portion of the selected email message.

For purposes of this example, assume that the user 116 has interacted with the GUI via the input device 112 to result in selection of the aforesaid "forward attachment only" option for handling the selected email message 400. At this stage, the client software application 114 running on the computing device 108 initiates preparation of a new email message. To this end, in this embodiment, the client software application 114 running on the computing device 108 prompts the user 116 to identify at least one intended recipient to which to forward the attachment 421 of the selected email message 400. As shown in FIG. 6, this can be achieved by the GUI providing a window 400 having at least one recipient field 402 in which the user 116 may provide, using the input device 112, a respective email address of each of the at least one intended recipient. In this example, two recipient fields 402 are shown, where one is a "to" field and the other is a "cc" (carbon copy) field. Of course, other recipient fields may also be provided, such as, without limitation, a "bcc" (blind carbon copy) field.

Optionally, in one embodiment, each of the at least one recipient field 402 may have a link to a "contacts" function that may be implemented by the client software application 114 running on the computing device 108 or by another application. Such "contacts" function has access to information regarding contacts associated with the user 116, such as, for example, a name, an email address, a street address, and/or a phone number for each contact. The link to the "contacts" function may be provided by a respective button (not shown) associated with each of the at least one recipient field 402. In such an embodiment, each of the at least one recipient field 402 may be populated by the user 116 interacting with the input device 112 to click on or otherwise select the respective button associated with that field and to select a respective name or email address of each of at least one contact desired to be an intended recipient.

As another possible option, each recipient field 402 may be populated by the client software application 114 running on the computing device 108 with information that is based on intended recipients previously used by the user 116. In such a case, the user 116 may enter in a given recipient field 402 one or more characters of an email address or name of a given intended recipient and, based on these one or more characters and information regarding recipients previously used, the client software application 114 may cause the GUI to display a suggested intended recipient or a menu of suggested intended recipients (not shown) adjacent to the given recipient field 402. The user 116 may then simply confirm the suggestion or select an intended recipient from the potential recipient menu, or enter completely new information in the given recipient field 402.

In this embodiment, the window 400 also comprises a body field 404 in which the user 116 may enter text data for transmission to the at least one intended recipient identified in the at least one recipient field 402. The window 400 also comprises a subject field 405 in which subject information may be entered by the user 116. It is noted that the body field 404 and the subject field 405 are initially blank when the window 400 is opened by the GUI. In some cases, depending on message set-up options selected by the user 116, rather than being blank, the body field 404 may initially contain only a signature block (not shown) associated with the user 116 and automatically provided by the client software application 114 running on the computing device 108. In other embodiments, the body field 404 and/or the subject field 405 may be omitted.

It will be appreciated that the window 400 may also provide other elements actionable by the user 116 to perform certain actions (e.g., formatting of text data possibly entered in the body field 404, provision of an indication of importance and/or sensitivity, etc.).

Continuing to refer to FIG. 6, the user 116 is provided with an opportunity to input a command to cause completion of preparation of the new email message for ultimate transmission to the at least one intended recipient previously specified via the at least one recipient field 402. For example, the GUI may provide in the window 400 a "send" button 406 that is actionable by the user 116 using the input device 112. For instance, the user 116 may use the input device 112 to click on the send button 406 to cause completion of preparation of the new email message for ultimate transmission to the at least one intended recipient previously specified via the at least one recipient field 402. Other manners of inputting a command to cause completion of preparation of the new email message for ultimate transmission to the at least one intended recipient previously specified via the at least one recipient field 402 may involve, for example, pressing one or more keys of a keyboard, touching a touchscreen, using a stylus, uttering one or more voice commands into a microphone, etc.

Figure 7:
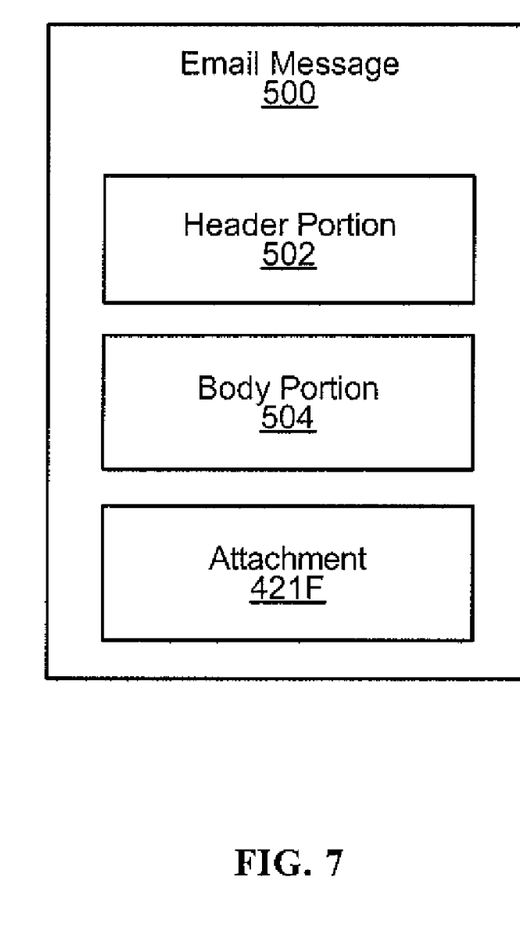
FIG. 7 shows the new email message including (1) an attachment that corresponds to the attachment of the selected email message and (2) a body portion that lacks the information content of the body portion of the selected email message and the header content of the header portion of the selected email message.

With reference to FIG. 7, the new email message, which is denoted 500, has an attachment 421F that corresponds to the attachment 421 of the selected email message 400. In addition, the new email message 500 has a header portion 502 and a body portion 504. The header portion 502 of the new email message 500 has header content that comprises sender information (pertaining to the user 116) and recipient information (pertaining to the at least one intended recipient previously specified via the at least one recipient field 402). The header content may also comprise other information such as information regarding a subject, a date and/or time, and/or an importance and/or sensitivity (e.g., high or low) associated with the new email message 500. The body portion 504 of the new email message 500 has information content that comprises text data previously entered via the body field 404. The body portion 504 may possibly also have ancillary content, which comprises non-text data (e.g., specification of a font size/type, a hyperlink, etc.) resulting from interaction of the user 116 with the input device 112. Alternatively, the body portion 504 may be blank, i.e., devoid of any information content and any ancillary content, where nothing was previously entered in the body field 404 (or where the body field 404 was not provided).

It is to be noted that the attachment 421F of the new email message 500 corresponds to the attachment 421 of the selected email message 400, i.e., the attachment 421F of the new email message 500 represents the very same file (e.g., a word processing document file, a spreadsheet file, a picture file, a video file, an audio file, etc.) that is represented by the attachment 421 of the selected email message 400. Although the attachments 421 and 421F represent the same file, the attachments 421 and 421F themselves need not be identical.

It is also to be noted that the body portion 504 of the new email message 500 lacks the information content of the body portion 419 of the selected email message 400. That is, the information content of the body portion 419 of the selected email message 400 is not included in the body portion 504 of the new email message 500. In this embodiment, the body portion 504 of the new email message 500 also lacks the header content of the header portion 417 of the selected email message 400. Thus, in this specific non-limiting embodiment, the header content of the header portion 417 and the information content of the body portion 419 of the selected email message 400 are not included in the body portion 504 of the new email message 500. Also, in this embodiment, the body portion 504 of the new email message 500 also lacks the ancillary content of the body portion 419 of the selected email message 400, if any. Thus, in this specific non-limiting embodiment, the header content of the header portion 417, the information content of the body portion 419, and the ancillary content of the body portion 419 (if any) of the selected email message 400 are not included in the body portion 504 of the new email message 500.

Figure 8:
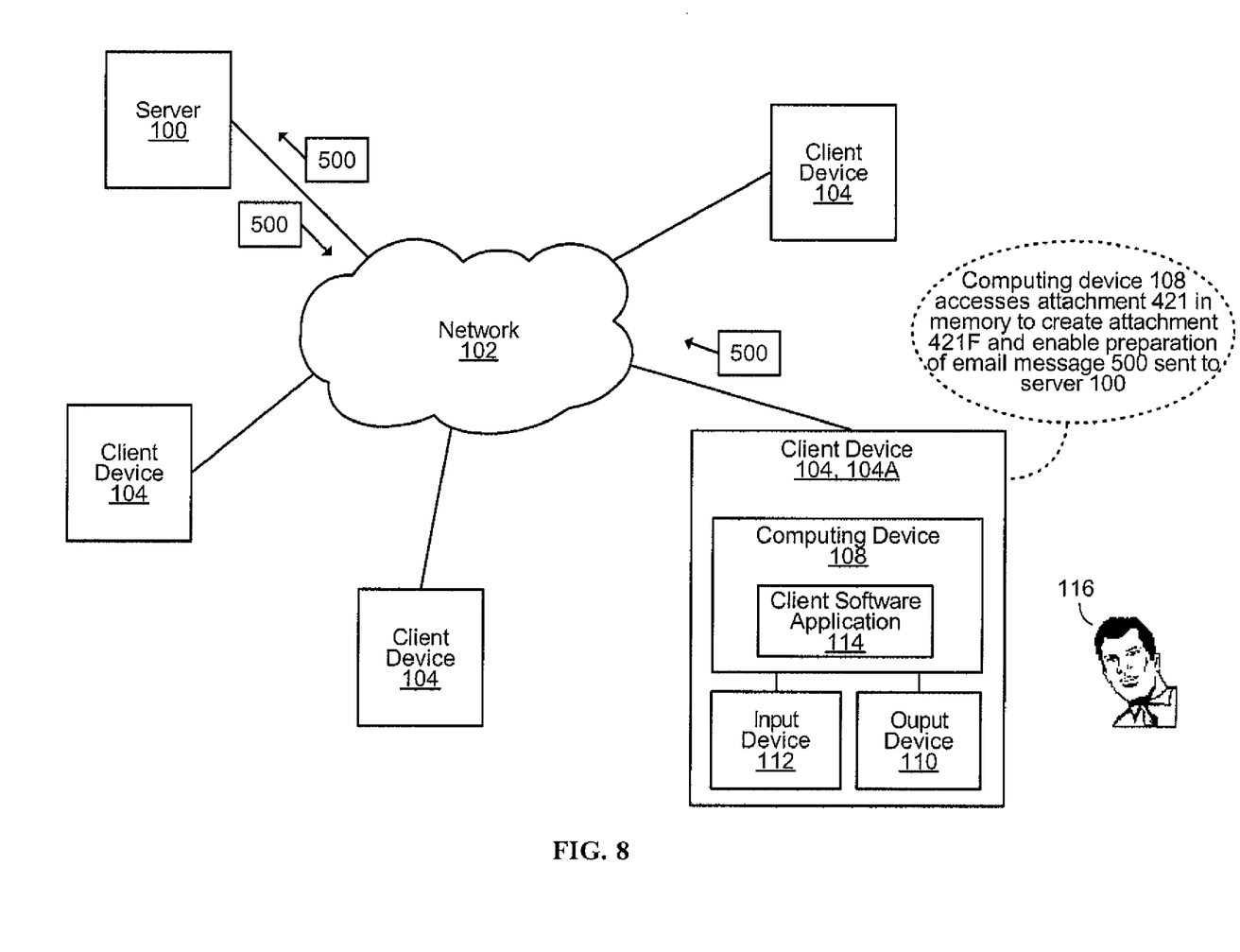
FIG. 8 shows completion of preparation of the new email message further to interaction with the window of FIG. 6, in accordance with one embodiment of the present invention.

In the specific case of FIG. 8, which illustrates a scenario where the attachment 421 is stored in a memory of the computing device 108, the attachment 421 is accessed in the memory in order to create the attachment 421F and enable preparation of the new email message 500 by the computing device 108. Following completion of preparation of the new email message 500, the new email message 500 is sent to the server 100, which may perform various functions such as domain name system (DNS) lookup to determine a respective IP address associated with each of the at least one intended recipient of the new email message 500, filtering, logging, caching, etc. In addition, the server 100 may bundle the new email message 500 into one or more IP packets for transmission into the network 102. In cases where one of the at least one intended recipient of the new email message 500 is one of the client devices 104 in communication with the server 100 (possibly even the client device 104A itself), then some of the previously mentioned steps can be omitted.

Figure 9:
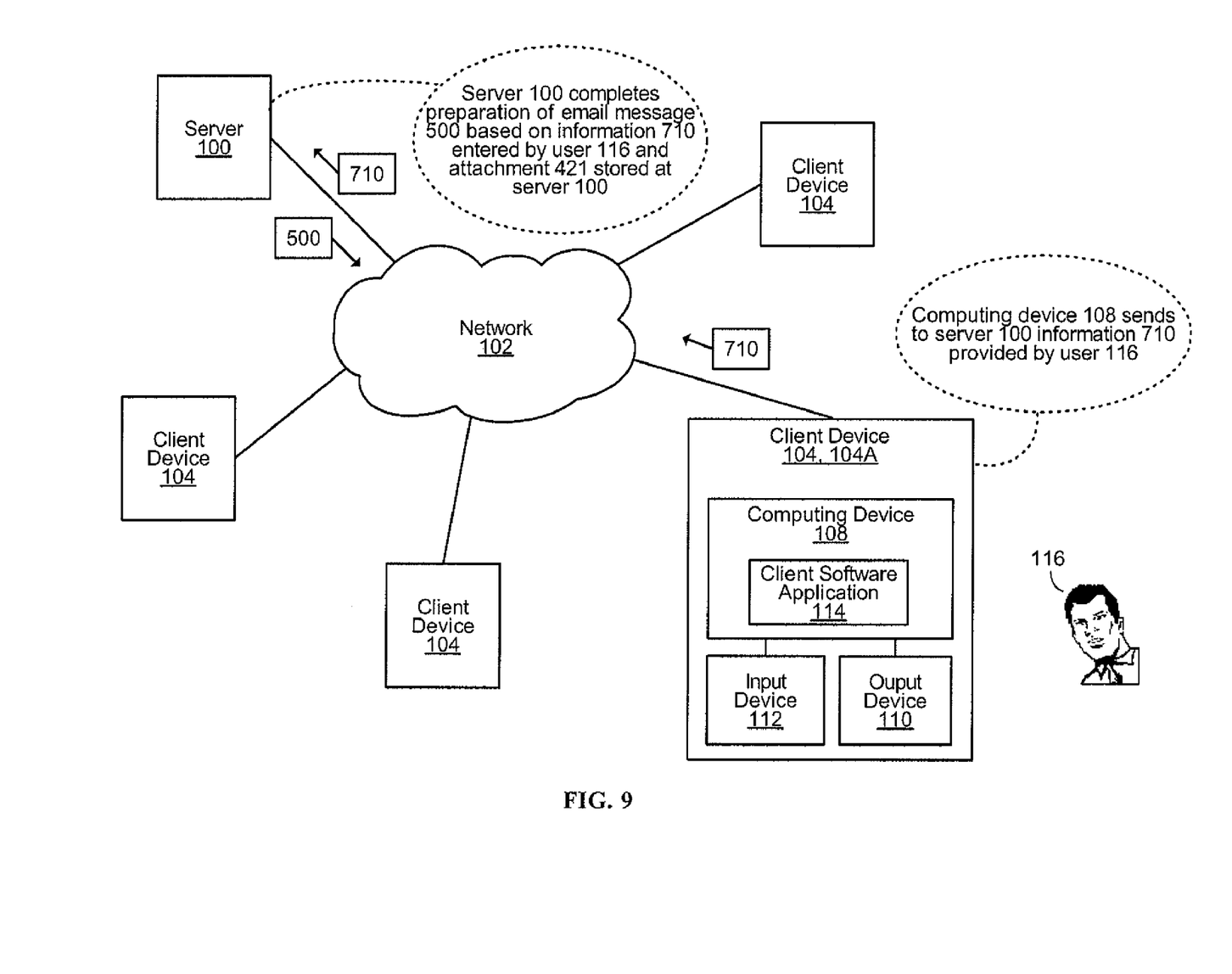
FIG. 9 shows completion of preparation of the new email message further to interaction with the window of FIG. 6, in accordance with another embodiment of the present invention.

In the specific case of FIG. 9, which illustrates a scenario where the server 100 hosts attachments for the client device 104A, the client software application 114 running on the computing device 108 still causes completion of preparation of the new email message 500 as described above. However, completion of preparation of the new email message 500 takes place at the server 100 based on (1) recipient information and possibly also text data and/or non-text data 710 provided by the computing device 108 and (2) the attachment 421 stored on the server 100. Again, the attachment 421F corresponds to the attachment 421.

It is recalled that, in the above example, the selected email message 400 has only one attachment 421. In another example, the selected email message 400 may have a plurality of attachments. In one case, the user 116 may wish to forward all of the attachments to each of at least one intended recipient without forwarding the body portion 419 and the header portion 417 of the selected email message 400. Such a case is handled in a manner identical to that described above with respect to the attachment 421 (which can be viewed as a collection of attachments). In another case, the user 116 may wish to forward a subset of the plurality of attachments. In such a case, and with reference to FIG. 6, the window 400 may include an additional field 700 listing the plurality of attachments by file name and/or representing the plurality of attachments by respective icons. By removing individual file names and/or icons from the list (using the input device 112), the user 116 may restrict which attachment(s) of the plurality of attachments he/she wishes to send to a given intended recipient.

Continuing with FIG. 6, the window 400 may allow the user 116 to select one or more additional attachments to be sent to the at least one intended recipient. For example, the GUI may provide in the window 400 a button 704 associated with optional adding of further attachments, the button 704 being actionable by the user 116 using the input device 112.

For instance, the user 116 may use the input device 112 to click on the button 704, which may lead to opening of a further window (not shown) that permits navigation through a file system and selection of one or more additional attachments. Other manners of selecting one or more additional attachments may involve, for example, pressing one or more keys of a keyboard, touching a touchscreen, using a stylus, uttering one or more voice commands into a microphone, etc.

In some embodiments, certain portions of the computing device 108 and/or the server 100 may be implemented as pre-programmed hardware or firmware elements (e.g., application specific integrated circuits (ASICs), electrically erasable programmable read-only memories (EEPROMs), etc.), or other related components. In other embodiments, certain portions of the computing device 108 and/or the server 100 may be implemented as a processor having access to a code memory which stores program instructions for operation of the processor. The program instructions may be stored on a medium which is fixed, tangible, and readable directly by these certain portions (e.g., removable diskette, CD-ROM, ROM, fixed disk, USB key, etc.). Alternatively, the program instructions may be stored remotely but transmittable to these certain portions via a modem or other interface device connected to a network over a transmission medium. The transmission medium may be either a tangible medium (e.g., optical or analog communications lines) or a medium implemented using wireless techniques (e.g., microwave, infrared or other wireless transmission schemes).

It will thus be apparent that the present invention allows rapid creation of an email message to conveniently forward only one or more attachments of a given original email message without forwarding other portions of that original email message. This can result in efficiencies when a user who received or transmitted an original email message having one or more attachments wishes to preserve anonymity of the original email message's sender and/or intended recipient(s) and/or wishes to avoid revealing the original email message's context. Efficiencies may also result when a user needs to create plural messages each personalized for a different set of one or more intended recipients (e.g., containing customized text data for each set of one or more intended recipients) but each having the same attachment(s). Of course, various other scenarios may arise in which this efficient forwarding of only one or more attachments of an original email message may be desired.

While certain embodiments of the present invention have been described and illustrated, it will be apparent to those skilled in the art that numerous modifications and variations can be made without departing from the scope of the invention, which is defined in the appended claims.

The invention claimed is:

1. An apparatus for email communication, the apparatus comprising:
   a memory portion; and
   a processing portion having access to the memory portion, the processing portion being operative for causing a graphical user interface to be presented to a user, the graphical user interface enabling the user to select a given email message, the given email message including a body portion and an attachment, the graphical user interface comprising a plurality of graphical elements representative of a plurality of options to handle the given email message, the plurality of graphical elements comprising:
    a first graphical element representative of a forward option; and
    a second graphical element representative of a forward attachment only option.

2. An apparatus as claimed in claim 1, wherein the second graphical element is a graphical button.

3. An apparatus as claimed in claim 1, wherein the second graphical element is an item in a graphical menu.

4. An apparatus as claimed in claim 1, wherein the second graphical element comprises text readable by the user, the text of the second graphical element conveying the forward attachment only option to the user.

5. An apparatus as claimed in claim 1, wherein the processing portion is operative for causing the graphical user interface to display at least one recipient field and a body field in response to the user selecting the second graphical element, the at least one recipient field allowing the user to enter information regarding at least one intended recipient of a new email message forwarding the attachment of the given email message, the body field allowing the user to enter text to be included in a body portion of the new email message, the body field lacking text of the body portion of the given email message when the body field is initially displayed.

6. An apparatus as claimed in claim 5, wherein the body field is blank or contains only a signature block when the body field is initially displayed.

7. An apparatus as claimed in claim 1, wherein the processing portion is operative for causing preparation of a new email message in response to the user selecting the second graphical element, die new email message including:
    a body portion lacking text of the body portion of the given email message; and
    an attachment corresponding to the attachment of the given email message.

8. An apparatus as claimed in claim 7, wherein the given email message includes a header portion comprising sender information regarding a sender of the given email message and recipient information regarding at least one intended recipient of the given email message, the body portion of the new email message lacking the sender information and the recipient information of the header portion of the given email message.

9. An apparatus as claimed in claim 7, wherein the graphical user interface comprises a third graphical element representative of a command to send the new email message, the processing portion being operative for causing transmission of the new email message in response to the user selecting the third graphical element.

10. An apparatus as claimed in claim 1, wherein the graphical user interface is presented on a display of a personal computer or a workstation.

11. An apparatus as claimed in claim 1, wherein the graphical user interface is presented on a display of a wireless communication device.

12. A computer-readable storage medium storing a program executable by a processing device to implement an email processing entity, the program comprising program code for causing a graphical user interface to be presented to a user, the graphical user interface enabling the user to select a given email message, the given email message including a body portion and an attachment, the graphical user interface comprising a plurality of graphical elements representative of a plurality of options to handle the given email message, the plurality of graphical elements comprising:
    a first graphical element representative of a forward option; and
    a second graphical element representative of a forward attachment only option.

13. A computer-readable storage medium as claimed in claim 12, wherein the second graphical element is a graphical button.

14. A computer-readable storage medium as claimed in claim 12, wherein the second graphical element is an item in a graphical menu.

15. A computer-readable storage medium as claimed in claim 12, wherein the second graphical element comprises text readable by the user, the text of the second graphical element conveying the forward attachment only option to the user.

16. A computer-readable storage medium as claimed in claim 12, wherein the graphical user interface displays at least one recipient field and a body field in response to the user selecting the second graphical element, the at least one recipient field allowing the user to enter information regarding at least one intended recipient of a new email message forwarding the attachment of the given email message, the body field allowing the user to enter text to be included in a body portion of the new email message, the body field lacking text of the body portion of die given email message when the body field is initially displayed.

17. A computer-readable storage medium as claimed in claim 16, wherein the body field is blank or contains only a signature block when the body field is initially displayed.

18. A computer-readable storage medium as claimed in claim 12, wherein the program comprises program code for causing preparation of a new email message in response to the user selecting the second graphical element, the new email message including:
    a body portion lacking text of the body portion of the given email message; and
    an attachment corresponding to the attachment of the given email message.

19. A computer-readable storage medium as claimed in claim 18, wherein the given email message includes a header portion comprising sender information regarding a sender of the given email message and recipient information regarding at least one intended recipient of the given email message, the body portion of the new email message lacking the sender information and the recipient information of the header portion of the given email message.

20. A computer-readable storage medium as claimed in claim 18, wherein the graphical user interface comprises a third graphical element representative of a command to send the new email message, the program comprising program code for causing transmission of the new email message in response to the user selecting the third graphical element.

21. A computer-readable storage medium as claimed in claim 12, wherein the graphical user interface is presented on a display of a personal computer or a workstation.

22. A computer-readable storage medium us claimed in claim 12, wherein the graphical user interface is presented on a display of a wireless communication device.

23. A computer-readable storage medium storing a program executable by a processing device to implement an email processing entity, the program comprising:
    program code for receiving an indication of a given email message selected by a user, the given email message including a body portion and an attachment;

program code for providing a plurality of options to handle the given email message, each of the options being selectable by the user, the plurality of options comprising:
    a first option to forward the given email message; and
    a second option to forward the attachment of the given email message without forwarding the body portion of the given email message; and program code for causing a new email message to be prepared in response to the user selecting the second option, the new email message including:
    a body portion lacking text of the body portion of the given email message; and
    an attachment corresponding to the attachment of the given email message;
the new email message being prepared without the user deleting the text of the body portion of the given email message from the new email message and without the user attaching the attachment of the given email message to the new email message.

\* \* \* \* \*